US011348282B1

(12) United States Patent
Averhart et al.

(10) Patent No.: US 11,348,282 B1
(45) Date of Patent: May 31, 2022

(54) SYSTEMS AND METHODS FOR CALIBRATING VEHICLE CAMERAS USING EXTERNAL SMART SENSOR

(71) Applicant: GM GLOBAL TECHNOLOGY OPERATIONS LLC, Detroit, MI (US)

(72) Inventors: Andrew W. Averhart, Redford, MI (US); Ismail Hamieh, Dearborn, MI (US); Mohsen Khalili, Sterling Heights, MI (US); Yousef A. Omar, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/167,343

(22) Filed: Feb. 4, 2021

(51) Int. Cl.
*H04N 17/00* (2006.01)
*G06T 7/80* (2017.01)
*B60R 11/04* (2006.01)

(52) U.S. Cl.
CPC ............... *G06T 7/80* (2017.01); *B60R 11/04* (2013.01); *H04N 17/002* (2013.01); *G06T 2207/30244* (2013.01); *G06T 2207/30252* (2013.01)

(58) Field of Classification Search
CPC ............ G06T 7/80; G06T 2207/30244; G06T 2207/30252; B60R 11/04; H04N 17/002
USPC ........................................................ 348/148
See application file for complete search history.

(56) References Cited

U.S. PATENT DOCUMENTS

| | | | | |
|---|---|---|---|---|
| 2006/0027404 | A1* | 2/2006 | Foxlin | G01C 25/005 178/18.06 |
| 2018/0307925 | A1* | 10/2018 | Wisniowski | G06V 10/454 |
| 2019/0172225 | A1* | 6/2019 | Park | G01S 17/42 |
| 2019/0204425 | A1* | 7/2019 | Abari | G05D 1/0225 |
| 2020/0207333 | A1* | 7/2020 | Miller | G01C 21/3602 |
| 2020/0320742 | A1* | 10/2020 | Margol | B60R 11/0229 |
| 2020/0363501 | A1* | 11/2020 | Lau | G01S 13/931 |
| 2021/0190922 | A1* | 6/2021 | Yu | G01S 15/931 |
| 2021/0225033 | A1* | 7/2021 | Yuan | H04N 17/002 |
| 2021/0239793 | A1* | 8/2021 | Yu | G01S 7/4026 |
| 2021/0387637 | A1* | 12/2021 | Rogers | H04W 4/48 |
| 2021/0405654 | A1* | 12/2021 | Ulun | G06T 7/80 |

FOREIGN PATENT DOCUMENTS

CN          105698765 A       6/2016

* cited by examiner

*Primary Examiner* — Michael Lee (57) ABSTRACT

A camera of a vehicle has a field of view. A perception module of the vehicle is configured to determine a location of an object relative to the vehicle based on a model for the camera and a camera ground truth orientation of the camera. A calibration module is configured to: wirelessly receive images from the camera; determine a vehicle camera target based on the images; when the vehicle camera target is aligned with a calibration module target on the calibration module, determine a present orientation of the calibration module measured using a gyroscope of the calibration module; when at least one component of the present orientation of the calibration module is different than the at least one component of an expected orientation of the calibration module, determine an updated camera ground truth orientation of the camera; and wirelessly transmit the updated ground truth orientation to the vehicle.

20 Claims, 8 Drawing Sheets

SYSTEMS AND METHODS FOR CALIBRATING VEHICLE CAMERAS USING EXTERNAL SMART SENSOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and smart sensors and more particularly to calibration of vehicle cameras.

Vehicles include one or more torque producing devices, such as an internal combustion engine and/or an electric motor. A passenger of a vehicle rides within a passenger cabin (or passenger compartment) of the vehicle.

Vehicles may include one or more different type of sensors that sense vehicle surroundings. One example of a sensor that senses vehicle surroundings is a camera configured to capture images of the vehicle surroundings. Examples of such cameras include forward facing cameras, rear facing cameras, and side facing cameras. Another example of a sensor that senses vehicle surroundings includes a radar sensor configured to capture information regarding vehicle surroundings. Other examples of sensors that sense vehicle surroundings include sonar sensors and light detection and ranging (LIDAR) sensors configured to capture information regarding vehicle surroundings.

SUMMARY

In a feature, a camera calibration system includes: a camera of a vehicle having a field of view; a perception module of the vehicle, the perception module configured to determine a location of an object relative to the vehicle based on a model for the camera and a camera ground truth orientation of the camera; a calibration module configured to: wirelessly receive images from the camera of the vehicle; determine a vehicle camera target based on the images from the camera of the vehicle; when the vehicle camera target is aligned with a calibration module target on the calibration module, determine a present orientation of the calibration module measured using a gyroscope of the calibration module; when at least one component of the present orientation of the calibration module is different than the at least one component of an expected orientation of the calibration module, determine an updated camera ground truth orientation of the camera of the vehicle; and wirelessly transmit the updated ground truth orientation to the vehicle.

In further features, the calibration module includes a display and is configured to display the vehicle camera target and the calibration module target on the display.

In further features, the calibration module is configured to move the vehicle camera target on the display as the calibration module moves.

In further features, the calibration module is configured to increase and decrease a size of the vehicle camera target on the display as the calibration module moves toward and away from the vehicle.

In further features, the calibration module includes actuators configured to move the calibration module relative to the vehicle.

In further features, the calibration module target is fixed on an exterior of the calibration module.

In further features, the present orientation of the calibration module includes a first three dimensional (3D) pose, and the expected orientation includes a second 3D pose.

In further features, the calibration module is configured to determine the updated camera ground truth orientation by performing simultaneous localization and mapping (SLAM) on a sequence of images captured using a camera of the calibration module.

In further features, the calibration module is configured to determine the updated camera ground truth orientation by further performing perspective n point (PnP) processing using a mapping resulting from the SLAM.

In further features, the camera calibration system further includes a perception module of the vehicle, the perception module configured to determine a location of an object relative to the vehicle based on a model for the camera and the updated camera ground truth orientation.

In further features, the calibration module is configured to determine the expected orientation based on the model.

In further features, the calibration module target and the vehicle camera target include checkerboard patterns.

In a feature, a camera calibration method includes: determining a location of an object relative to a vehicle based on a model for a camera of a vehicle and a camera ground truth orientation of the camera, the camera having a field of view; wirelessly receiving images from the camera of the vehicle; determining a vehicle camera target based on the images from the camera of the vehicle; when the vehicle camera target is aligned with a calibration module target on a calibration module, determining a present orientation of the calibration module measured using a gyroscope of the calibration module; when at least one component of the present orientation of the calibration module is different than the at least one component of an expected orientation of the calibration module, determining an updated camera ground truth orientation of the camera of the vehicle; and wirelessly transmitting the updated ground truth orientation to the vehicle.

In further features, the camera calibration method further includes, by the calibration module, displaying the vehicle camera target and the calibration module target on a display of the calibration module.

In further features, the camera calibration method further includes, by the calibration module, moving the vehicle camera target on the display as the calibration module moves.

In further features, the camera calibration method further includes, by the calibration module, increasing and decreasing a size of the vehicle camera target on the display as the calibration module moves toward and away from the vehicle, respectively.

In further features, the camera calibration method further includes, by one or more actuators of the calibration module, moving the calibration module relative to the vehicle.

In further features, the calibration module target is fixed on an exterior of the calibration module.

In further features, the present orientation of the calibration module includes a first three dimensional (3D) pose, and the expected orientation includes a second 3D pose.

In further features, the camera calibration method further includes determining a location of an object relative to the vehicle based on a model for the camera and the updated camera ground truth orientation.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include a camera configured to capture images within a predetermined field of view (FOV) around an exterior of the vehicle. A perception module may determine a location of an object near the vehicle based on one or more images from the camera and a stored camera ground truth orientation.

The present camera orientation, however, may vary from the camera ground truth orientation under some circumstances. For example, the present camera orientation may vary from the present camera ground truth orientation if the camera is contacted by an object, a component that the camera is fixed to is replaced or repaired, and/or under one or more other circumstances. Accuracy of functionality of the perception module (e.g., object location and orientation) may be decreased when the present camera orientation varies from the camera ground truth orientation.

The present application involves a calibration module configured to communicate with a vehicle to determine whether to re-calibrate the camera ground truth orientation. The calibration module may be actuated to align a target on the calibration module with a vehicle target. When the target is aligned with the vehicle target, a present calibration module orientation of the calibration module is captured and compared with an expected orientation. If the present calibration module orientation matches the expected orientation, re-calibration of the ground truth camera orientation may not be needed. If the present calibration module orientation does not match the expected orientation, the calibration module determines an updated camera ground truth orientation of the vehicle, for example, using simultaneous localization and feature matching (SLAM) and perspective-n-point (PnP) to determine the updated camera ground truth orientation. The vehicle may update the stored camera ground truth orientation to the updated camera ground truth orientation determined by the calibration module to re-calibrate the camera ground truth orientation.

Figure 1:
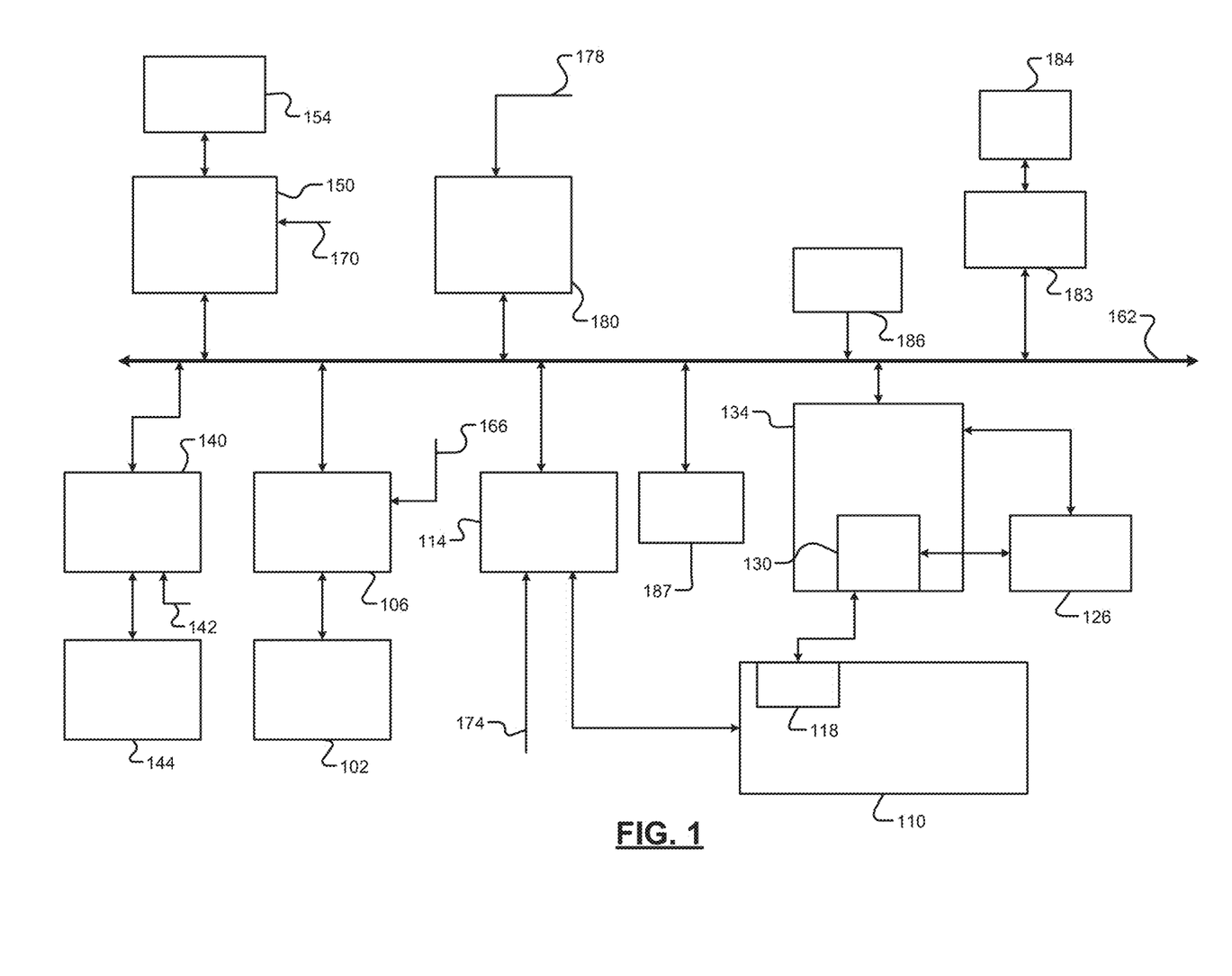
FIG. 1 is a functional block diagram of an example vehicle system.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system. An electronic brake control module (EBCM) 150 may selectively control (e.g., friction) brakes 154 of the vehicle based on one or more driver inputs, such as a brake pedal position (BPP) 170.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. The BPP 170 may be provided to the EBCM 150. A position 174 of a park, reverse, neutral, drive lever (PRNDL) may be provided to the TCM 114. An ignition state 178 may be provided to a body control module (BCM)

180. For example, the ignition state 178 may be input by a driver via an ignition key, button, or switch. At a given time, the ignition state 178 may be one of off, accessory, run, or crank.

An infotainment module 183 may output various information via one or more output devices 184. The output devices 184 may include, for example, one or more displays, one or more sets of virtual reality (VR) goggles, one or more sets of augmented reality (AR) goggles, one or more other suitable types of video output devices, one or more speakers, one or more haptic devices, and/or one or more other suitable types of output devices. In various implementations, goggles may include one or more video devices and one or more speakers.

The infotainment module 183 may output video via the one or more displays, one or more sets of VR goggles, and/or one or more sets of AR goggles. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays.

The vehicle may include a plurality of external sensors and cameras, generally illustrated in FIG. 1 by 186. One or more actions may be taken based on input from the external sensors and cameras 186. For example, the infotainment module 183 may display video, various views, and/or alerts on a display via input from the external sensors and cameras 186 during driving.

As another example, based on input from the external sensors and cameras 186, a perception module 187 perceives objects around the vehicle and locations of the objects relative to the vehicle. The ECM 106 may adjust torque output of the engine 102 based on input from the perception module 187. Additionally or alternatively, the PIM 134 may control power flow to and/or from the electric motor 118 based on input from the perception module 187. Additionally or alternatively, the EBCM 150 may adjust braking based on input from the perception module 187. Additionally or alternatively, the steering control module 140 may adjust steering based on input from the perception module 187. For example, one or more actions may be taken to avoid a perceived object.

The vehicle may include one or more additional control modules that are not shown, such as a chassis control module, a battery pack control module, etc. The vehicle may omit one or more of the control modules shown and discussed.

Figure 2:
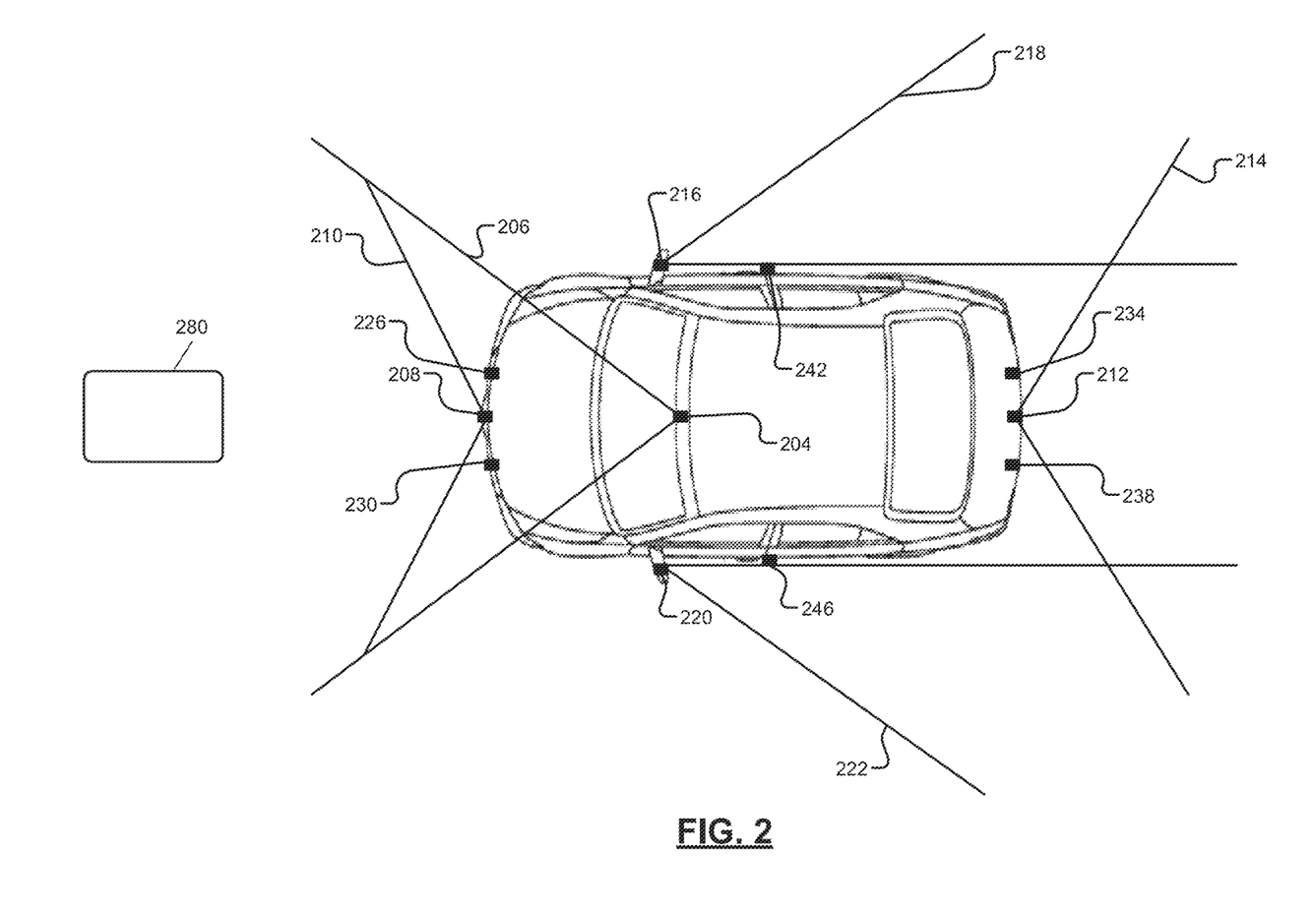
FIG. 2 is a functional block diagram of a vehicle including various external cameras and sensors.

Referring now to FIG. 2, a functional block diagram of a vehicle including examples of external sensors and cameras is presented. The external sensors and cameras 186 (FIG. 1) include various cameras positioned to capture images and video outside of (external to) the vehicle and various types of sensors measuring parameters outside of (external to) the vehicle. Examples of the external sensors and cameras 186 will now be discussed. For example, a forward facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward facing camera 204 may be located more rearward, however, such as with a rear view mirror at a windshield of the vehicle. The forward facing camera 204 may not be able to capture images and video of items within all of or at least a portion of the predetermined FOV of the front camera 208 and may capture images and video more than the predetermined distance of the front of the vehicle. In various implementations, only one of the forward facing camera 204 and the front camera 208 may be included.

A rear camera 212 captures images and video within a predetermined FOV 214 behind the vehicle. The rear camera 212 may be located at the rear of the vehicle, such as near a rear license plate.

A right camera 216 captures images and video within a predetermined FOV 218 to the right of the vehicle. The right camera 216 may capture images and video within a predetermined distance to the right of the vehicle and may be located, for example, under a right side rear view mirror. In various implementations, the right side rear view mirror may be omitted, and the right camera 216 may be located near where the right side rear view mirror would normally be located.

A left camera 220 captures images and video within a predetermined FOV 222 to the left of the vehicle. The left camera 220 may capture images and video within a predetermined distance to the left of the vehicle and may be located, for example, under a left side rear view mirror. In various implementations, the left side rear view mirror may be omitted, and the left camera 220 may be located near where the left side rear view mirror would normally be located. While the example FOVs are shown for illustrative purposes, the present application is also applicable to other FOVs. In various implementations, FOVs may overlap, for example, for more accurate and/or inclusive stitching.

The external sensors and cameras 186 may additionally or alternatively include various other types of sensors, such as ultrasonic sensors, radar sensors, etc. For example, the vehicle may include one or more forward facing ultrasonic sensors, such as forward facing ultrasonic sensors 226 and 230, one or more rearward facing ultrasonic sensors, such as rearward facing ultrasonic sensors 234 and 238. The vehicle may also include one or more right side ultrasonic sensors, such as right side ultrasonic sensor 242, and one or more left side ultrasonic sensors, such as left side ultrasonic sensor 246. The locations of the cameras and ultrasonic sensors are provided as examples only and different locations could be used. Ultrasonic sensors output ultrasonic signals around the vehicle.

The external sensors and cameras 186 may additionally or alternatively include one or more other types of sensors, such as one or more sonar sensors, one or more radar sensors, and/or one or more light detection and ranging (LIDAR) sensors.

In various implementations, as discussed further below, a calibration module 280 and the vehicle communicate to calibrate one or more of the cameras of the vehicle. The calibration module 280 may be implemented by, for example, in a mobile device (e.g., a smartphone, a tablet device, a robotic device, or another suitable type of device) executing an application.

Figure 3:
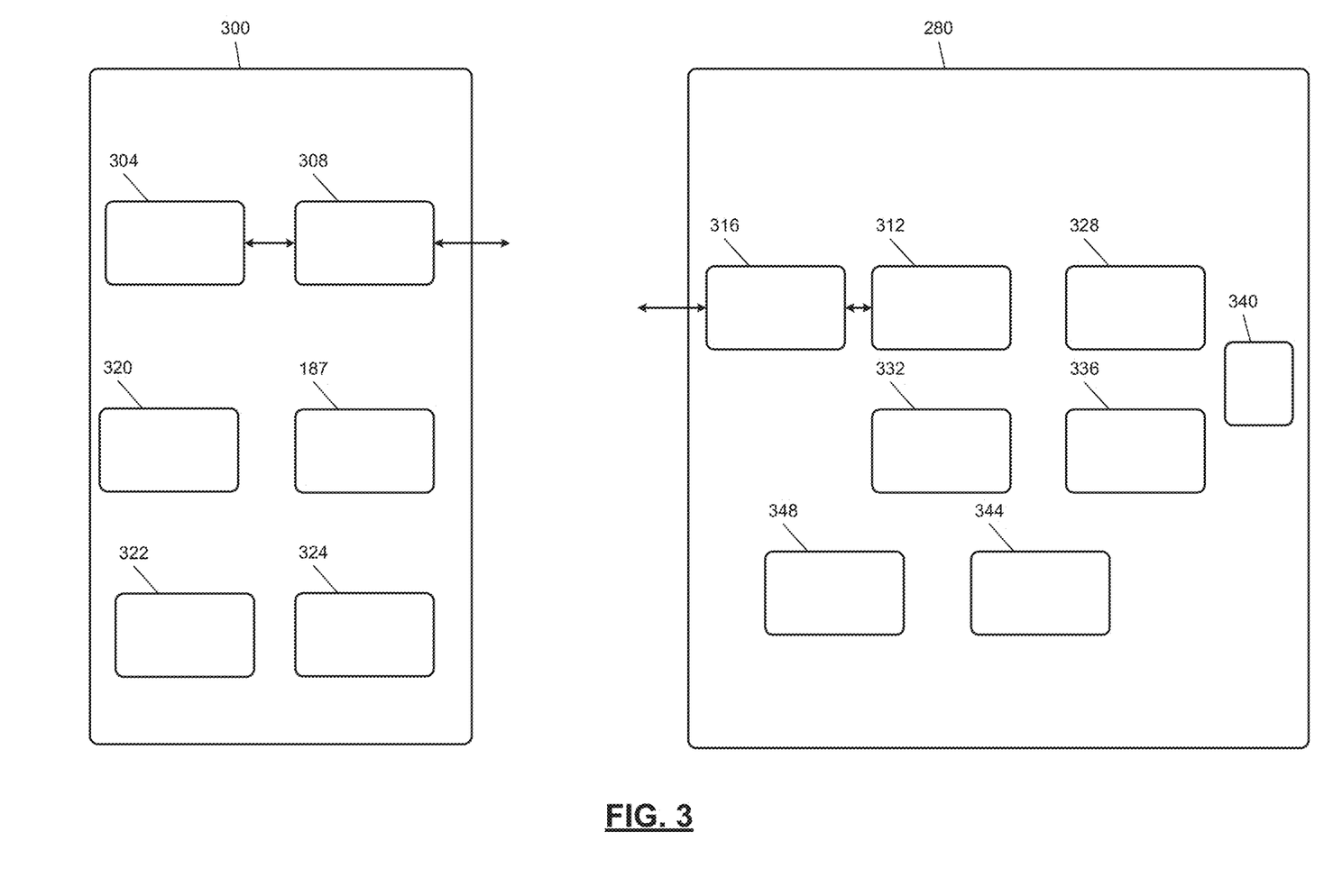
FIG. 3 is a functional block diagram of an example camera calibration system.

FIG. 3 is a functional block diagram of an example camera calibration system. The vehicle 300 includes a communication module 304 and one or more antennas 308.

The communication module 304 wirelessly communicates using one or more communication protocols, such as according to an IEEE 802.11 communication protocol, a Bluetooth communication protocol, and/or one or more other suitable wireless communication protocols. The communication module 304 may include one or more transceivers.

The calibration module 280 includes a communication module 312 that wirelessly communicates via one or more antennas 316 using the one or more communication protocols, such as according to the IEEE 802.11 communication protocol, the Bluetooth communication protocol, and/or the one or more other suitable wireless communication protocols. The communication module 312 may include one or more transceivers.

The vehicle 300 includes a camera 320, such as one of the cameras discussed above. The perception module 187 performs object recognition and identification based on images from the camera 320. The perception module 187 may determine a location of an object relative to the vehicle using the images from the camera 320, an intrinsic model 322, and a stored ground truth orientation 324 of the camera 320. The ground truth orientation 324 and the intrinsic model 322 may be stored in memory.

The calibration module 280 and the vehicle 300 communicate to determine whether the ground truth orientation 324 should be updated. If so, the calibration module 280 and the vehicle 300 communicate to determine an updated ground truth orientation 324 for the camera 320 and to store the updated ground truth orientation as the ground truth orientation 324 for use by the perception module 187 and/or the camera 320.

The calibration module 280 includes a gyroscope 328 that determines a present orientation of the calibration module 280. Orientations may include roll, pitch, and yaw or other suitable orientation parameters. In various implementations, the gyroscope 328 may be implemented in an inertia measurement unit (IMU) module. The calibration module 280 also includes a processor module 332 and may include a display 336. The calibration module 280 exhibits a calibration module target 340 for the calibration of the ground truth orientation 324. For example, the calibration module target 340 may be adhered to the calibration module 280 or displayed on the display 336. In various implementations, the calibration module 280 may include one or more actuators 344 configured to actuate the calibration module 280 such as forward and backward, left and right, and to adjust the present orientation of the calibration module 280.

The calibration module 280 also includes a camera 348 that is used to update/calibrate the ground truth orientation 324 under some circumstances, as described further below.

Figure 4:
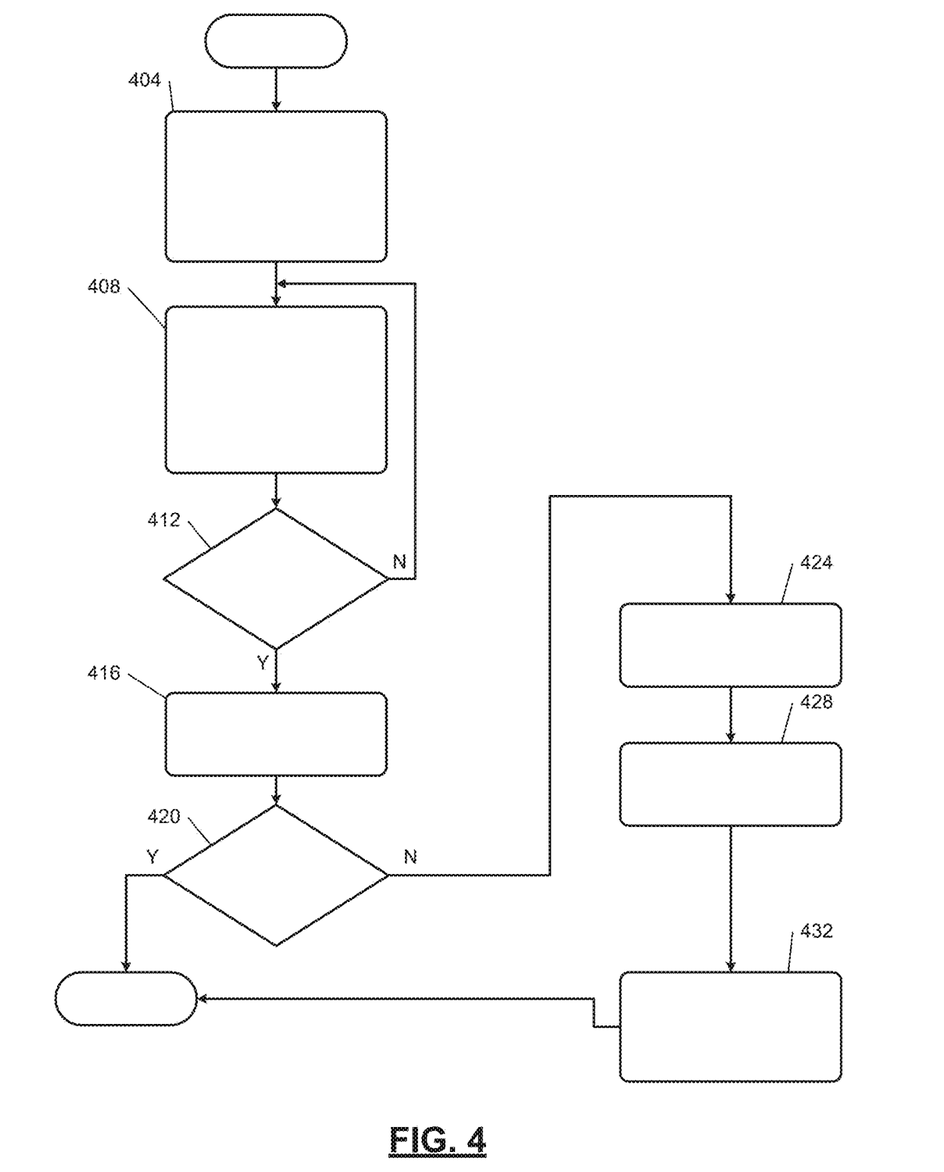
FIG. 4 is a flowchart depicting an example method of calibrating a camera of a vehicle.

FIG. 4 is a flowchart depicting an example method of calibrating the camera 320. The calibration module 280 (exhibiting the calibration module target 340) is positioned within the field of view of the camera 320. At 404, the communication module 304 of the vehicle 300 transmits the model 322, images (frames) from the camera 320 and the ground truth camera orientation 324 of the camera 320 to the calibration module 280.

At 408, the processor module 332 determines a vehicle target based on the images. More specifically, the processor module 332 detects the calibration module target 340 in the images from the vehicle as the vehicle target. The processor module 332 also determines an expected orientation of the calibration module 280, such as based on the model 322 and the ground truth camera orientation 324 of the camera.

Figure 6:
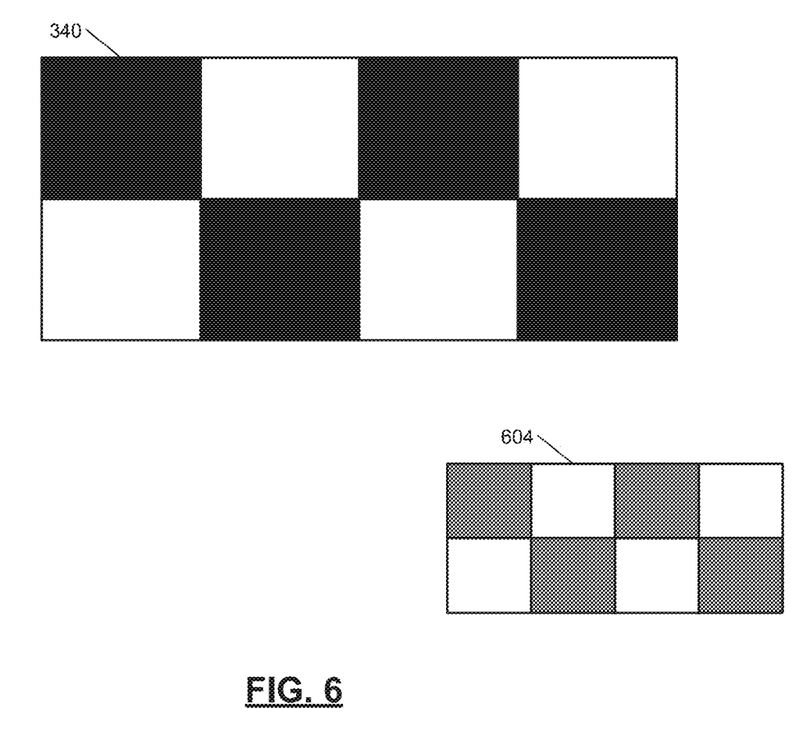
FIGS. 6-8 are example images depicting a sequence of aligning a target on a calibration module with a target for the camera of the vehicle.
Figure 7:
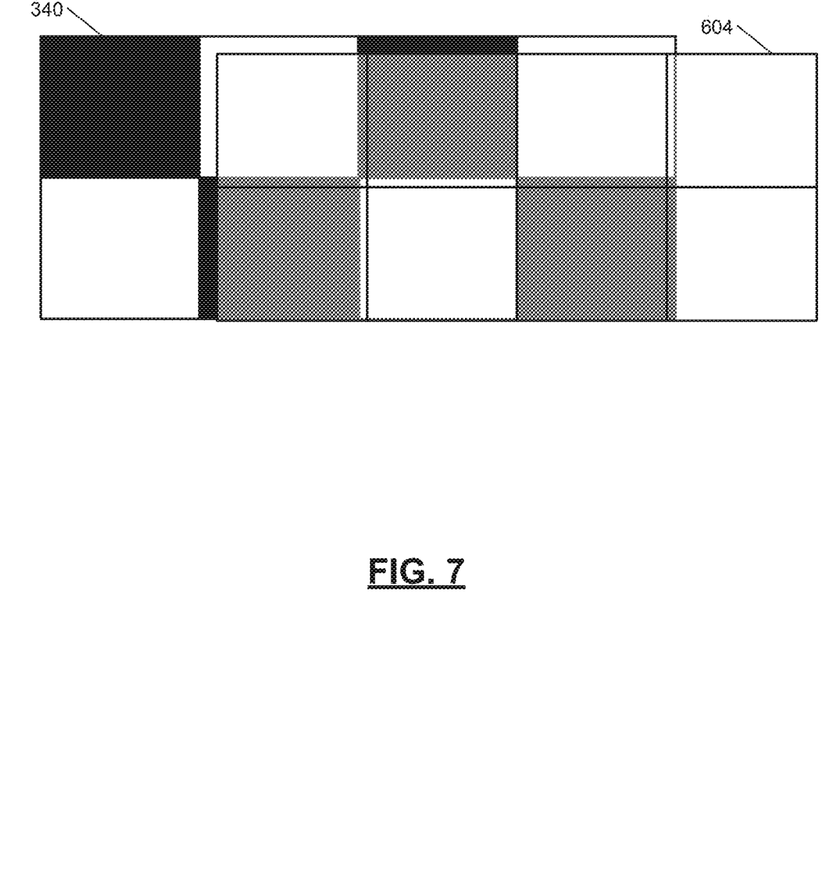
Figure 8:
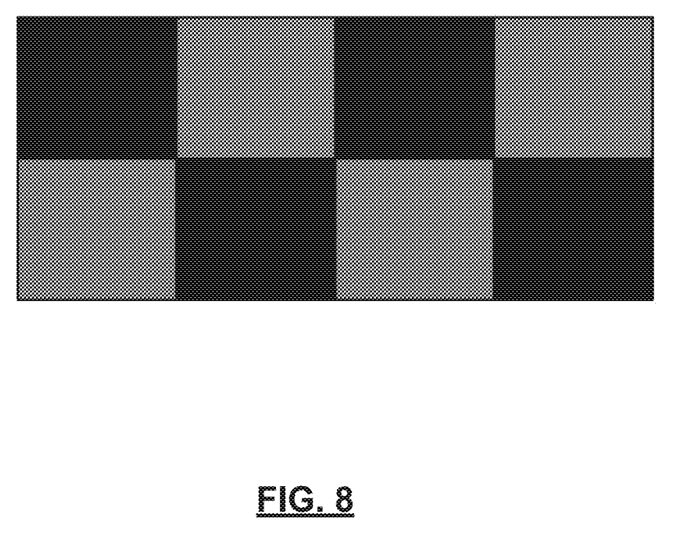

The processor module 332 may actuate one or more of the actuators 344 to actuate the calibration module 280 to align the calibration module target 340 with the vehicle target. In various implementations, the processor module 332 may display the vehicle target and the calibration module target 340 on the display 336, and a user may move the calibration module 280 to align the calibration module target 340 with the vehicle target. FIGS. 6-8 include example illustrations of a vehicle target 604 and the calibration module target 340, such as when displayed on the display 336. While the example of checker board (alternating black and white squares) targets is provided, the present application is also applicable to other types of targets.

The processor module 332 may maintain the calibration module target 340 fixed on the display 336. The processor module 332 may change an orientation of the vehicle target 604 on the display 336 as the calibration module 280 moves (in the images from the vehicle). For example, in FIG. 6 the vehicle target 604 appears smaller than the calibration module target 340. The processor module 332 may increase a size of the vehicle target 604 as the calibration module 280 moves toward the vehicle 300 (and as a size of the calibration module target 340 increases in the images of the camera of the vehicle). The processor module 332 may similarly move the vehicle target 604 left and right as the calibration module 280 moves left and right, respectively. The processor module 332 may similarly move the vehicle target 604 up and down as the calibration module 280 moves up and down, respectively. In various implementations, the opposite may be true regarding left, right, up, and down movements of the calibration module 280.

FIG. 7 illustrates an example where the calibration module 280 has been moved toward the vehicle 300. The calibration module 280 has also moved upwardly and left toward alignment of the vehicle target 604 with the calibration module target 340 in FIG. 7. The calibration module target 340 and the vehicle target 604 partially overlap. However, the calibration module target 340 is still not completely aligned with the vehicle target 604 in the example of FIG. 7. FIG. 8 illustrates an example where the calibration module target 340 is aligned with the vehicle target 604.

Referring back to FIG. 4, the processor module 332 determines whether the calibration module target 340 is aligned with the vehicle target at 412. If 412 is true, control continues with 416. If 412 is false, control may return to 408 to continue toward alignment of the calibration module target 340 with the vehicle target.

At 416, the processor module 332 captures the present calibration module orientation of the calibration module 280 measured by the gyroscope 328. The calibration module orientation includes the 3 dimensional (3D) orientation dimensions (e.g., rotations) measured by the gyroscope 329. At 420, the processor module 332 determines whether the present orientation of the calibration module 280 (when the calibration module target 340 was aligned with the vehicle target) is within a predetermined range of the expected orientation. For example, the processor module 332 may determine whether a first dimension of the present orientation is within the predetermined range of the associated dimension of the expected orientation, the a second dimension of the present orientation is within the predetermined range of the associated dimension of the expected orientation, and a third dimension of the present orientation is within the predetermined range of the associated dimension of the expected orientation. If 420 is true, control may end and the calibration module 280 may leave the ground truth orientation 324 unchanged in the vehicle 300. If 420 is false, control may transfer to 424.

At 424, the processor module 332 determines a present camera ground truth orientation (of the camera 320), as discussed further below in conjunction with FIG. 5. At 428, the communication module 312 of the calibration module 280 communicates the present camera ground truth orientation to the vehicle 300. At 432, the perception module 187 stores the received present camera ground truth orientation as the ground truth orientation 324 in memory. This calibrates the camera 320 (and the ground truth orientation 324) for use given the current orientation and positioning of the camera 320.

Figure 5:
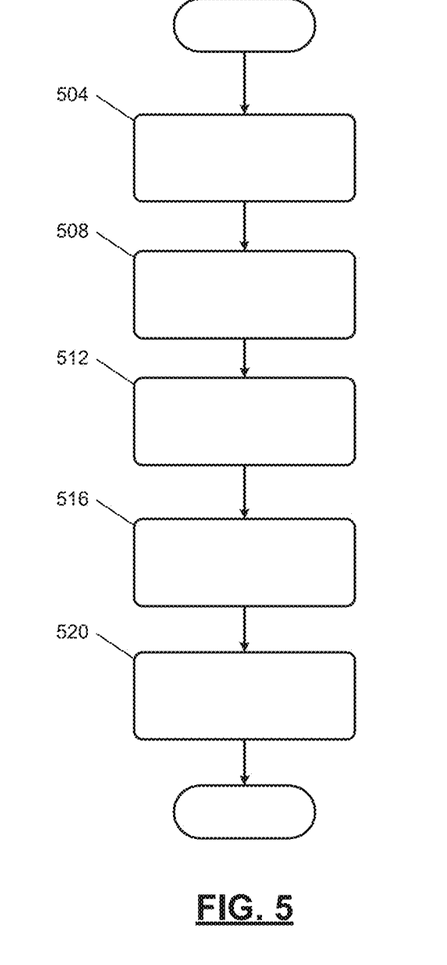
FIG. 5 is a flowchart depicting an example method of determining the present camera ground truth orientation of the vehicle.

FIG. 5 is a flowchart depicting an example method of determining the present camera ground truth orientation (of the camera 320). Control begins with 504 where the communication module 312 requests from the vehicle 300 and receives a present orientation (e.g., 6 degree of freedom or a 3 degree of freedom pose) of the camera 320, such as relative to the vehicle 300. The perception module 187 may determine the present orientation of the camera 320, for example, based on a position of a component that the camera 320 is in or attached to, a present orientation (e.g., roll, pitch, and yaw) of the vehicle 300, and/or one or more other parameters. The perception module 187 may update the present orientation of the camera 320 at a predetermined rate, for example, to account for any movement of the camera 320 during calibration.

At 508-516, the processor module 332 may execute a localization and mapping algorithm, such as the simultaneous localization and mapping (SLAM) algorithm. At 508, the processor module 332 may perform feature extraction and feature matching using a sequence of images of the camera 348 using feature extraction and feature matching algorithms. For example, the processing module 332 may identify corners of the vehicle 300, etc.

At 512, the 512, the processor module may update a location and orientation of the calibration module 280 relative to the vehicle 300 (e.g., the camera 320). At 516, the processor module generates a mapping of the vehicle 300 based on the location of the calibration module 280, the orientation of the calibration module 280, and the extracted and matched features on a sequence of images of the vehicle captured using the camera 348 of the calibration module 280 and processing accelerometer and gyroscope signals. If a mapping of the vehicle 300 is already stored in memory of the calibration module 280, the processor module 332 may update the mapping. If a mapping is not yet stored in the memory of the calibration module 280, the processor module 332 may store the mapping in the memory. In various implementations, 508 and 512 may be performed in parallel (e.g., simultaneously).

At 520, the processor module 332 determines the present camera ground truth orientation based on the mapping (from 516) and the present orientation of the camera 320 (from 504). The processor module 332 may determine the present camera ground truth orientation, for example, using the perspective-n-point (PnP) algorithm or another suitable type of algorithm for determining orientation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A camera calibration system comprising:
a camera of a vehicle having a field of view;
a perception module of the vehicle, the perception module configured to determine a location of an object relative to the vehicle based on a model for the camera and a camera ground truth orientation of the camera;
a calibration module configured to:
wirelessly receive images from the camera of the vehicle;
determine a vehicle camera target based on the images from the camera of the vehicle;
when the vehicle camera target is aligned with a calibration module target on the calibration module, determine a present orientation of the calibration module measured using a gyroscope of the calibration module;
when at least one component of the present orientation of the calibration module is different than the at least one component of an expected orientation of the calibration module, determine an updated camera ground truth orientation of the camera of the vehicle; and
wirelessly transmit the updated camera ground truth orientation to the vehicle.

2. The camera calibration system of claim 1 wherein the calibration module includes a display and is configured to display the vehicle camera target and the calibration module target on the display.

3. The camera calibration system of claim 2 wherein the calibration module is configured to move the vehicle camera target on the display as the calibration module moves.

4. The camera calibration system of claim 2 wherein the calibration module is configured to increase and decrease a size of the vehicle camera target on the display as the calibration module moves toward and away from the vehicle.

5. The camera calibration system of claim 1 wherein the calibration module includes actuators configured to move the calibration module relative to the vehicle.

6. The camera calibration system of claim 1 wherein the calibration module target is fixed on an exterior of the calibration module.

7. The camera calibration system of claim 1 wherein the present orientation of the calibration module includes a first three dimensional (3D) pose, and the expected orientation includes a second 3D pose.

8. The camera calibration system of claim 1 wherein the calibration module is configured to determine the updated camera ground truth orientation by performing simultaneous localization and mapping (SLAM) on a sequence of images captured using a camera of the calibration module.

9. The camera calibration system of claim 8 wherein the calibration module is configured to determine the updated camera ground truth orientation by further performing perspective n point (PnP) processing using a mapping resulting from the SLAM.

10. The camera calibration system of claim 1 further comprising a perception module of the vehicle, the perception module configured to determine a location of an object relative to the vehicle based on a model for the camera and the updated camera ground truth orientation.

11. The camera calibration system of claim 1 wherein the calibration module is configured to determine the expected orientation based on the model.

12. The camera calibration system of claim 1 wherein the calibration module target and the vehicle camera target include checkerboard patterns.

13. A camera calibration method comprising:

determining a location of an object relative to a vehicle based on a model for a camera of a vehicle and a camera ground truth orientation of the camera, the camera having a field of view;

wirelessly receiving images from the camera of the vehicle;

determining a vehicle camera target based on the images from the camera of the vehicle;

when the vehicle camera target is aligned with a calibration module target on a calibration module, determining a present orientation of the calibration module measured using a gyroscope of the calibration module;

when at least one component of the present orientation of the calibration module is different than the at least one component of an expected orientation of the calibration module, determining an updated camera ground truth orientation of the camera of the vehicle; and wirelessly transmitting the updated camera ground truth orientation to the vehicle.

14. The camera calibration method of claim 13 further comprising, by the calibration module, displaying the vehicle camera target and the calibration module target on a display of the calibration module.

15. The camera calibration method of claim 14 further comprising, by the calibration module, moving the vehicle camera target on the display as the calibration module moves.

16. The camera calibration method of claim 14 further comprising, by the calibration module, increasing and decreasing a size of the vehicle camera target on the display as the calibration module moves toward and away from the vehicle, respectively.

17. The camera calibration method of claim 13 further comprising, by one or more actuators of the calibration module, moving the calibration module relative to the vehicle.

18. The camera calibration method of claim 13 wherein the calibration module target is fixed on an exterior of the calibration module.

19. The camera calibration method of claim 13 wherein the present orientation of the calibration module includes a first three dimensional (3D) pose, and the expected orientation includes a second 3D pose.

20. The camera calibration method of claim 13 further comprising determining a location of an object relative to the vehicle based on a model for the camera and the updated camera ground truth orientation.

* * * * *